Dec. 28, 1943.  O. W. HOSKING  2,337,555
METHOD OF COATING METAL AND ARTICLES PRODUCED THEREBY
Filed Oct. 12, 1938

INVENTOR
Oakley W. Hosking,
BY Arthur A. Johnson
ATTORNEY

Patented Dec. 28, 1943

2,337,555

UNITED STATES PATENT OFFICE 2,337,555

METHOD OF COATING METAL AND ARTICLE PRODUCED THEREBY

Oakley W. Hosking, Monroe, N. Y., assignor to Composite Rubber Products Corporation, Bridgeport, Conn., a corporation of Connecticut Application October 12, 1938, Serial No. 234,616

12 Claims. (Cl. 154—2)

This invention relates to the art of securing rubber and rubber-like substance to metal pieces, and to composite articles of rubber or rubber-like material and metal.

It has long been a desideratum in the arts to form a strong and lasting bond between rubber and metal pieces so that the pieces would remain united in firm and fast relation from coming apart against mechanical forces such as a force tending to pull rubber and metal apart or torsion tending to twist the rubber from the metal.

While fair results have been obtained by the use of adhesives or cements on certain materials to which the rubber or rubber substance could be vulcanized or otherwise secured, the methods heretofore practiced were not capable of producing a sufficient bond between the metal and the rubber or rubber substance to satisfy many requirements in the arts.

Many proposals have been made for accomplishing the desired result, but, so far as I am aware, in none of these proposals, where the metal and rubber are to be secured together by direct contact between the metal and the rubber, has satisfactory results been obtained.

In some instances there are employed interlocking connections in the form of roughened surfaces produced by pickling the metal, sandblasting the same or forming actual protuberances or notches in the metal around which and between which the rubber is caused to flow, thus making a mechanical bond between the rubber and the metal. As the strength of the bond depends upon the extent to which the rubber and metal interlock, the effectiveness of this physical union depends upon the kind and strength of the destructive force applied to the two pieces.

I have discovered that a metal piece may be secured to a piece of rubber or rubber substance if the metal piece is provided with a clean and smooth, preferably polished, Monel metal surface. The metal piece may be made entirely of Monel metal, or, if desired, the portion of the metal piece which is to be bonded to the rubber may be covered with a thin piece of Monel metal secured to the main portion of the piece by welding, soldering or the like.

While "Monel" is a trade-mark, it is used herein in the sense defined by the dictionaries that is as an alloy comprising "approximately 67 per cent of nickel, 28 of copper, and 5 of other elements, chiefly iron and manganese, made by direct reduction from ore in which the constituent metals occur in these proportions." I have found that an alloy having the constituent metals in the percentages mentioned above is most applicable for use in my process.

I have found that uncured, partially cured or cured rubber or rubber substance may be secured to the clean polished surface by bringing the Monel metal surface and rubber substance together under heat and pressure and without the intermediary of any additional or other substance, and that the bond between the Monel metal surface and the rubber is greater than the cohesion between the molecules of the rubber. The union is so great that a destructive force will cause the rubber to break down within itself before the bond is broken between the rubber and the Monel metal surface.

I have discovered that, contrary to expectations, the bond between the rubber and the Monel metal is better when the surface of the Monel metal is smooth and polished, and that, when the surface of the Monel metal is cleaned and made irregular in an effort to increase the mechanical union between the Monel metal and the rubber, the bond between the Monel metal surface and the rubber occurs where the metal is smooth and bright and does not occur where the metal is roughened and dull. Thus, by partly roughening and partly polishing a piece of Monel metal, the bond between the rubber and the metal can be effected only between the rubber and the contacting area of the metal which is smooth and bright.

I have determined experimentally that the same rubber substance which unites with the Monel metal will not bond with common metals such as nickel, copper, iron or alloys such as steel, brass and bronze without the intermediary of a cementitious rubber containing coating, or without roughening or pitting the metal to obtain a mechanical union.

I have also discovered that rubber substances may be vulcanized onto metal pieces which are plated with Monel metal. This plating being applied by the hot spray method, seems to change the texture of the surface of the Monel metal so that it cannot be sufficiently cleaned and polished to directly take the piece of rubber. However, I have found that a plated Monel surface, as well as a surface of commercially pure nickel may be vulcanized to a piece of rubber or rubber substance if the metal surface is first provided with a thin film of rubber cement.

Other features and advantages will hereinafter appear.

In the drawing—

Figure 7:
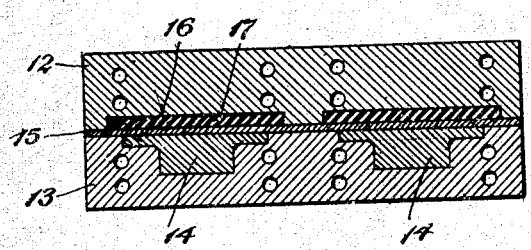
Fig. 7 is a view showing a platen introduced between the upper and lower parts of a mold and which is employed to premold a piece of rubber before bonding it to the piece of metal which is to be inserted in the lower die.
Figure 8:
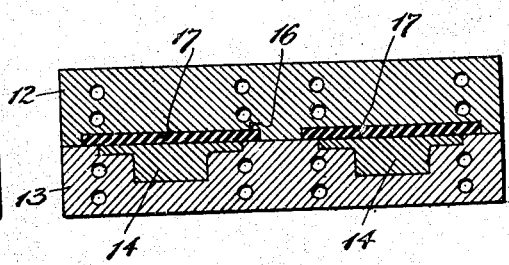

Fig. 8, a view similar to Fig. 7, is a diagrammatic illustration of how the metal and rubber piece may be held in a vulcanizing press while being heated and maintained under pressure.

In the accompanying drawing, in some instances, the pieces of rubber substance are larger than the metal pieces, and in other instances they are smaller. It should be understood that these differences in the sizes of the pieces are merely to facilitate the understanding of the drawing.

In practicing the present invention, where practically the entire face of the metal part is to be bonded to the rubber and the article has little mass, the whole metal piece may usually be made economically of Monel metal. Where, however, the metal part has a great deal of mass and a comparatively small surface to be bonded to the rubber piece, it will be found in many cases desirable to make the metal piece of a base metal such as iron, steel, brass or the like and diagrammatically illustrated in Fig. 4 by the piece 10, and to weld, solder or otherwise secure a thin piece of Monel metal indicated at 11 in Fig. 4 to the surface of the base metal.

In either case, in practicing the present invention, the surface of the Monel metal which is to be brought in direct contact with the piece of rubber substance is cleaned and polished so as to be free of corrosion oxides, oil, etc. and have a smooth, bright surface. This polished Monel metal surface may, according to the present invention, be bonded by placing it in direct contact with a piece of vulcanizable rubber or rubber substance and pressing the two together in the presence of heat, during which operation the rubber substance becomes vulcanized at the same time that it becomes bonded to the metal piece.

I have previously set out the percentages as given by the leading dictionaries of the English language of the constituent metals of which the alloy, marketed under the trade name of "Monel," is formed. This definition is very similar to the published analysis of "Monel" as given by the exclusive producers thereof, the International Nickel Corporation. The analysis given by the producers of the alloy is as follows:

| | Per cent |
|---|---|
| Nickel | 68 |
| Copper | 29 |
| Iron | 1.6 |
| Manganese | 1.0 |
| Silicon | 0.10 |
| Carbon | 0.15 |
| Sulphur | 0.005 |

Throughout the specification where I mentioned Monel metal, I am referring to the alloy embraced within the definition given by the dictionaries set out hereinbefore.

The rubber may be in a crude plasticized form, and during its formation and curing action may be bonded to the Monel metal surface, in which case the Monel metal piece is placed in a suitable mold shaped to receive it and shaped to produce the desired shape of the rubber piece when the curing process is completed. I have found that best results are obtained when the pressure of the press containing the molds is applied gradually, thereby avoiding excessive friction between the rubber and the Monel metal surface while the rubber piece is being formed to shape. Thereafter the pressure is maintained constant during the curing of the rubber and the bonding operation. Preferably, the mold, the Monel metal piece, and the rubber piece are preheated before the curing and bonding operation begins.

According to the present invention, however, the rubber substance need not be plasticized but may be precured or partially cured. This may be done by precuring or partially curing the rubber piece in a separate press and then assembling it with the Monel metal piece to be bonded thereto in another press. When this is done, the premolded piece is simply laid directly on the Monel metal surface without the intermediary of any other material or substance and brought together under heat and pressure.

The time required for the bonding operation depends upon whether the rubber substance is in crude, semicured or cured form, the degree of which the same has been preheated, the heat condition existing in the presses or molds as well as the pressures employed in the same. When the rubber piece is cured or semicured, the bonding operation may be completed in from three to fifteen minutes, depending upon the shapes of the pieces and the mass of the materials.

It is not necessary, however, to mold the rubber pieces and precure or semicure the same in another press. According to the present invention as illustrated in Figs. 7 and 8, one half of the mold 12 may contain the cavities for shaping the rubber pieces. The other half of the mold 13 may contain the cavities for holding the metal pieces 14. Between the two molds, there may be initially inserted a plate or platen 15 on which pieces of plasticized rubber may be placed under the cavities 16 in the part 12 of the mold. The parts of the mold are then brought together under heat and pressure, and the rubber pieces 17 are formed and precured or semicured depending on the length of time the pieces are subject to the curing action. When this has been done, the platen 15 is withdrawn from between the parts 12 and 13 of the mold, and the metal pieces 14 are then inserted in the cavities in the part 13 of the mold if they were not already placed there before the molding operation began.

When the platen 15 is withdrawn from between the mold parts, any flash formed by the molding of the rubber pieces 17 that will adhere to the platen 15 will be carried away with the platen to be scraped off later. The parts 12 and 13, one containing the precured or semicured rubber pieces 17 and the other containing the pieces 14 having the Monel metal surface, are brought together under heat and pressure to bond the rubber to the metal.

When the bonding operation is completed and the molds separated, the metal pieces and rubber pieces, being now united, may be removed from the mold as one by any suitable stripping means. The practice of the method used and of the apparatus just described avoids the necessity of stripping the premolded rubber pieces from the mold and the relocation of them in another mold to be bonded to the metal piece.

Figure 1:
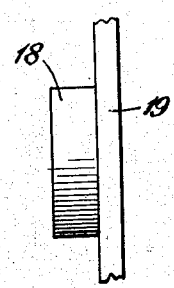
Figure 1 is a side view of one composite article and made according to this invention.
Figure 2:
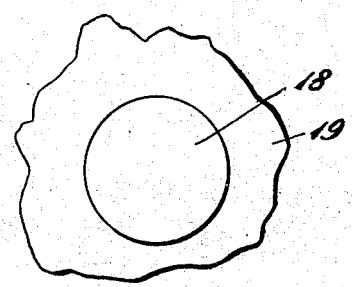
Fig. 2 is a plan view thereof.
Figure 4:
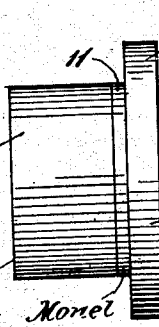
Fig. 4 is an elevation showing a composite article comprising, for the most part, a base metal and containing a facing of Monel metal to which is bonded the piece of rubber substance.
Figure 5:
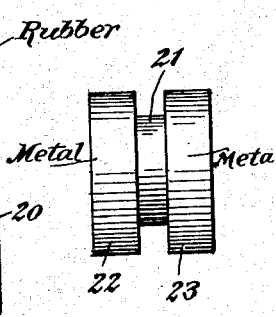
Fig. 5 is a plan view of another composite article, in which a piece of rubber substance is interposed between and bonded to two metal pieces.
Figure 6:
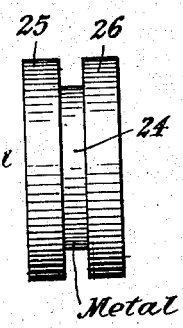
Fig. 6 is a side view of another composite article, in which the piece of metal is interposed between and bonded to two pieces of rubber substance.

With the methods of the present invention, a piece of metal 18, Fig. 1, with a polished Monel metal surface thereon, may be secured to a piece of rubber 19, or, as shown in Fig. 4, the piece of base metal 10 may have a thin piece 11 of Monel metal secured thereto and to which a piece of rubber 20 is bonded. Either the metal or the rubber may be attached to another piece of rubber or metal respectively, and by the same methods. As shown in Fig. 5, a piece of rubber 21 may be interposed and bonded between two pieces of metal 22 and 23, or a piece of metal 24, as shown in Fig. 6, may be interposed and bonded between two pieces of rubber 25 and 26.

One of the more important features of this invention is that the metal and rubber may be bonded together by processes similar to the process of vulcanizing rubber to rubber and actually while the rubber is being cured.

According to the present invention, it is not necessary that the metal piece be bonded directly to the rubber article to which it is ultimately to be attached. The piece of metal may be bonded to a piece of rubber substance of suitable size and proportion, and the later may be vulcanized to a larger piece of rubber substance. In this way, metal articles may be manufactured and bonded to rubber base pieces in one place or at one time to be united with the rubber article ultimately to contain it at another place or time.

Likewise, a rubber article may be made at one place or time to be united with a piece of metal at another place or time.

One of the more important advantages of the present invention is that Monel metal itself has many advantages over other metals and alloys, is substantially noncorrosive, has great tensile strength, and is worked as easily as other metals of the same toughness and wearing qualities.

I have also discovered that rubber and rubber substance may be bonded to pieces of metal having a commercially pure nickel surface and to Monel metal surfaces which are produced as for example by hot spraying Monel metal onto a piece of base metal, but that the bonding cannot be entirely successfully effected without the intermediary of other substances.

I have found that a surface of commercially pure nickel or hot-sprayed Monel metal, if coated with a thin film of vulcanizable rubber cement, will form a satisfactory bond with a piece of rubber substance under heat and pressure sufficient to cure the rubber. Thus, where the metal piece has an irregular surface which would be hard to polish or superposed with a piece of Monel metal, the piece of baser metal may be hot sprayed with Monel metal, provided with the film of vulcanizable rubber cement and bonded to a piece of rubber by heat and pressure.

Contrary to my expectations, I have discovered that roughening or serrating the Monel metal surface to be engaged by the rubber does not improve the bond between the rubber and the metal. In fact, it reduces the union between these two parts and makes it only partial.

It is my belief that the reason for the rubber substance not bonding to the plated Monel surface is that this surface contains myriads of minute depressions, which, when contacted with the rubber substance in the molds and presses, retain the air or gases trapped therein, with the result that the rubber substance cannot contact the metal. By using the film of vulcanizable rubber solution, the air in these cavities is dislodged and the space filled with vulcanizable material.

Accordingly, in any situation where the surface of the Monel metal is such as to prevent air-trapping cavities, I prefer to coat the surface of the metal with the thin vulcanizable rubber solution.

Figure 3:
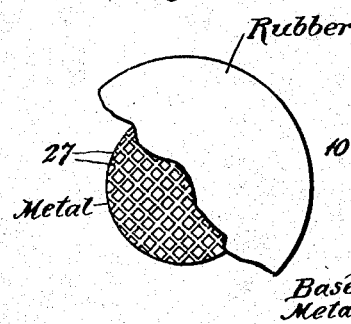
Fig. 3 is a plan view of another composite article, with part of the rubber substance omitted to show the way the metal may be formed so that the area of the bond between the rubber and the metal is reduced.

Thus, when it is desired to reduce the bond between the Monel metal surface and the surface of a piece of rubber for any reason, it is merely necessary to provide on the Monel metal piece grooves, such as the grooves 27 shown in Fig. 3, before bringing the surface of the metal and the rubber substance into direct contact. In this situation, the bond will only occur where the Monel metal surface is smooth, clean and polished—no bond taking effect where the metal is roughened and dulled by the grooving.

Throughout the specification where I have mentioned rubber or rubber-like substance, I intend these terms to include all caoutchouc, derivatives thereof, and substitutes therefrom which are vulcanizable.

Variations and modifications may be made within the scope of this invention and portions of the improvements may be used without others.

I claim:

1. The art of bonding rubber substance to metal which comprises providing on a piece of metal a clean, bright, continuously smooth surface of Monel metal; placing in direct contact with said Monel surface a piece of cured rubber substance; and subjecting the rubber substance and metal to heat and pressure sufficient to cause cohesion between contacting areas of said rubber substance and the said Monel metal surface of the piece of metal.

2. The art of bonding rubber substance to metal which comprises providing on a piece of metal a clean, bright, continuously smooth, polished surface of Monel metal; placing in direct contact with said Monel metal surface a piece of partially cured rubber substance; and subjecting the metal and rubber substance to heat and pressure sufficient to cause the rubber substance to be cured and to cohere to said Monel metal surface.

3. The art of bonding rubber substance to metal which comprises providing on a piece of metal a clean, bright, continuously smooth surface of Monel metal; placing in direct contact with said Monel metal surface a piece of crude rubber substance; and subjecting the metal and rubber substance to heat and pressure sufficient to cause the rubber substance to be cured and to cohere to said Monel metal surface.

4. The method of bonding rubber to metallic articles wherein the strength of the bond produced exceeds the tensile strength of the rubber, which comprises coating said articles by spraying Monel metal thereon; applying a film of vulcanizable rubber cement to the coated surface; bringing rubber containing a vulcanizing agent into engagement with the thus treated surface; and vulcanizing the rubber onto said surface.

5. The method of bonding rubber to a metallic article wherein the strength of the bond produced exceeds the tensile strength of the rubber, which comprises coating the surface of said article with Monel metal; applying a film of vulcanizable rubber cement to said coat of Monel metal; bringing rubber into engagement with the thus treated surface; and vulcanizing the rubber onto said surface.

6. The method of bonding rubber substance to a metallic article which comprises securing to said article a thin plate of Monel metal having a clean, bright, continuously smooth, polished surface; placing in direct contact with said polished surface a piece of curable rubber substance; and subjecting the metal and rubber substance to heat and pressure sufficient to cause cohesion between the rubber substance and the polished Monel metal surface.

7. A new article of manufacture comprising a piece of metal having on at least one face thereof a continuously smooth, polished Monel metal surface with a vulcanized rubber substance cohering directly to said surface.

8. A new article of manufacture comprising a metallic article; a thin layer of Monel metal having a continuously smooth, polished exterior surface secured thereon; and a piece of rubber substance vulcanized directly to said exterior Monel metal surface.

9. The process of forming a composite article of metal and rubber substance which comprises molding and partially curing a body of rubber substance containing a vulcanizing agent; applying a polished Monel metal piece in surface engagement with said rubber substance; and continuing the curing process to vulcanize the rubber substance to said piece.

10. The process of forming a composite article of metal and a rubber substance, which comprises molding and partially curing a body of rubber substance containing a vulcanizing agent; exposing one surface of the rubber without stripping the rubber from the mold; applying a metal article having a clean, polished, continuously smooth Monel metal surface to the exposed surface of the molded rubber substance, said Monel metal surface forming contact with the exposed rubber surface; and applying sufficient heat and pressure to vulcanize the rubber to the metal surface.

11. A new article of manufacture, having on at least one of its faces, a thin, hot-sprayed layer of Monel metal; and a piece of vulcanized rubber substance securely bonded to the Monel metal surface by means of an intermediate film-like layer of vulcanized rubber cement, the strength of the bond between said Monel metal surface and rubber substance exceeding the tensile strength of the rubber.

12. The method of bonding rubber to metal which comprises providing on a piece of metal, a clean, bright, continuously smooth surface of Monel metal, placing in direct contact with said Monel metal surface a piece of rubber substance, and subjecting the metal and rubber substance to heat and pressure sufficient to cause cohesion between contacting areas of said rubber substance and the said surface of the piece of Monel metal.

OAKLEY W. HOSKING.

CERTIFICATE OF CORRECTION.

Patent No. 2,337,555. December 28, 1943.

OAKLEY W. HOSKING.

It is hereby certified that error appears in the printed specification of the above numbered patent requiring correction as follows: Page 3, first column, line 28, for "later" read --latter--; and second column, line 5, for "prevent" read --present--; page 4, first column, line 9, for "cohension" read --cohesion--; and that the said Letters Patent should be read with this correction therein that the same may conform to the record of the case in the Patent Office.

Signed and sealed this 16th day of May, A. D. 1944.

Leslie Frazer (Seal)               Acting Commissioner of Patents.